(12) United States Patent
Ueta et al.

(10) Patent No.: US 9,413,159 B2
(45) Date of Patent: Aug. 9, 2016

(54) SWITCHING CIRCUIT PROTECTOR

(71) Applicant: YAZAKI CORPORATION, Minato-ku, Tokyo (JP)

(72) Inventors: Keisuke Ueta, Shizuoka (JP); Akinori Maruyama, Shizuoka (JP); Yoshihide Nakamura, Shizuoka (JP); Yoshinori Ikuta, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 68 days.

(21) Appl. No.: 14/391,833

(22) PCT Filed: Apr. 5, 2013

(86) PCT No.: PCT/JP2013/002369
§ 371 (c)(1),
(2) Date: Oct. 10, 2014

(87) PCT Pub. No.: WO2013/161198
PCT Pub. Date: Oct. 31, 2013

(65) Prior Publication Data
US 2015/0138682 A1 May 21, 2015

(30) Foreign Application Priority Data
Apr. 24, 2012 (JP) .................................. 2012-098899

(51) Int. Cl.
*H02H 3/08* (2006.01)
*H02H 9/02* (2006.01)
*H02H 5/04* (2006.01)

(52) U.S. Cl.
CPC ............... *H02H 3/085* (2013.01); *H02H 5/048* (2013.01)

(58) Field of Classification Search
CPC .......... H02H 3/08; H02H 3/087; H02H 3/089
USPC ................................................. 361/93.1, 91.1
See application file for complete search history.

(56) References Cited

U.S. PATENT DOCUMENTS

| 8,270,138 B2 * | 9/2012 | Takahashi ............ H03K 17/687 361/101 |
| 2010/0254059 A1 | 10/2010 | Higuchi et al. |
| 2011/0080681 A1 | 4/2011 | Maruyama et al. |

FOREIGN PATENT DOCUMENTS

| DE | 10257425 A1 | 6/2004 |
| EP | 2296243 A1 | 3/2011 |
| JP | 2009-130944 A | 6/2009 |
| JP | 2009-226984 A | 10/2009 |
| JP | 2010-172191 A | 8/2010 |
| WO | 2010/140474 A1 | 12/2010 |

OTHER PUBLICATIONS

Japanese Office Action issued on Jan. 19, 2016 in the counterpart Japanese patent application.

* cited by examiner

*Primary Examiner* — Dharti Patel
(74) *Attorney, Agent, or Firm* — Mots Law, PLLC

(57) ABSTRACT

A switching circuit protector switches a semiconductor device (11) provided in a switching circuit connecting a power supply (VB) to a load (RL), from a PWM drive state to a DC drive state when an estimated temperature of a cable of the switching circuit estimated by a temperature estimator (22) exceeds a threshold temperature (Tth), in the state where the semiconductor device (11) is controlled to operate in the PWM drive state to drive the load (RL). Therefore, when an overcurrent is caused in the cable, the estimated temperature exceeds the threshold temperature (Tth) so as to break the semiconductor device (11). Accordingly, the switching circuit can surely be protected by the switching circuit protector.

10 Claims, 4 Drawing Sheets

SWITCHING CIRCUIT PROTECTOR

TECHNICAL FIELD

The present invention relates to a switching circuit protector which immediately breaks and protects a switching circuit for supplying power to a load installed in a vehicle, when an overcurrent is caused in the switching circuit.

BACKGROUND ART

Generally, a controller for controlling a load installed in a vehicle is equipped with a switching circuit protector for immediately breaking a switching circuit when an overcurrent is caused in the load. PTL 1 discloses such a conventional switching circuit protector. A switching circuit protector according to the conventional example disclosed in PTL 1 is configured to estimate a temperature of a switching circuit by calculating a quantity of heat generation and a quantity of heat radiation of the switching circuit (including a cable connecting a load to a power supply, and a semiconductor switch) based on a current flowing in the load and measuring an ambient temperature, and break the switching circuit when the estimated temperature is equal to or higher than a threshold value thereby protecting the load connected to the switching circuit.

However, when the semiconductor switch is controlled with PWM (pulse width modulation) to operate the load, the switching circuit protector according to the conventional example may fail to appropriately break the semiconductor switch when the cable is heated if an error is caused in the estimated temperature. The following is an explanation of such a case with reference to the timing chart illustrated in FIG. 1.

In FIG. 1, plot (a) represents sampling period for estimating the temperature, plot (b) represents a timing of ON/OFF signals of the semiconductor switch with the PWM drive, and plot (c) represents a current flowing in the cable. The temperature of the cable repeats a cycle, as illustrated by a curve P11, where the temperature increases when on-duty and decreases when off-duty. In other words, the temperature of the cable increases when turning on the semiconductor switch, and decreases when turning off the semiconductor switch. Thus, the temperature of the cable varies to repeat the cycle of the ON/OFF state.

When an error is caused in the estimated temperature of the cable, the estimated temperature may indicate a numerical value lower than the actual temperature of the cable, as illustrated by a curve P12 in FIG. 1. That is, although the actual temperature of the cable (the curve P11) exceeds a threshold value Tth, the estimated temperature (the curve P12) may fall below the threshold value Tth. In such a case, the protector cannot break the semiconductor switch. As a result, the temperature of the cable may increase and then exceed the threshold temperature Tth.

CITATION LIST

Patent Literature

[PTL 1]
US 2010/0254059 A1

SUMMARY OF INVENTION

In the switching circuit protector according to the conventional example, an increased temperature and a decreased temperature are detected based on the current flowing in the cable and the conducting time, and the temperature of the cable is estimated based on the increased temperature and the decreased temperature. Thus, when the semiconductor switch is controlled with PWM, the switching circuit protector cannot break the semiconductor switch even though the temperature of the cable exceeds the threshold temperature Tth when an error is caused in the estimated temperature.

The present invention has been made in view of the above-described problem. It is an object of the present invention to provide a switching circuit protector capable of breaking a switching circuit, which controls a semiconductor switch to operate in a PWM drive state to drive a load, by reliably detecting an increase in temperature of the circuit.

In order to achieve the object, a switching circuit protector according to a first aspect of the present invention protects a switching circuit that connects a power supply to a load against heat generation, the switching circuit protector includes: a semiconductor switch provided in the switching circuit to switch the load from a driven state to a stopped state; a current sensor for detecting a current flowing in the switching circuit; a controller configured to control the semiconductor switch to operate in a PWM drive state when receiving a drive input signal; a temperature estimator for estimating a temperature of a cable of the switching circuit based on the current flowing in the switching circuit and a conducting time of the current as an estimated temperature; an anomaly determiner which outputs an off command to the semiconductor switch when the estimated temperature exceeds a predetermined threshold temperature; and an overcurrent determiner which determines whether or not the current detected by the current sensor exceeds a predetermined threshold current. The controller changes the semiconductor switch from the PWM drive state to a DC drive state when the overcurrent determiner determines that the current exceeds the threshold current.

The controller may be configured to control the semiconductor switch to return to the PWM drive state from the DC drive state when the current falls below the threshold current after the overcurrent determiner determines that the current exceeds the threshold current.

In the switching circuit protector according to the first aspect of the present invention, in the state where the semiconductor switch is controlled to operate in the PWM drive state so as to drive the load, the semiconductor switch is shifted from the PWM drive state to the DC drive state once the estimated temperature exceeds the threshold temperature. Therefore, when an overcurrent is caused, the estimated temperature exceeds the threshold temperature, so that the semiconductor switch is broken by the switching circuit protector. Accordingly, the switching circuit protector can surely protect the switching circuit and the load.

Further, when the current flowing in the load falls below the threshold current, the semiconductor switch may be controlled to be shifted from the DC drive state to the PWM drive state. In such a case, the semiconductor switch can be prevented from being affected by the influence of an inrush current caused when turning on the semiconductor switch or noise.

DESCRIPTION OF EMBODIMENTS

Hereinafter, an embodiment of the present invention will be explained with reference to the drawings.

(Configuration Explanation)

Figure 1:
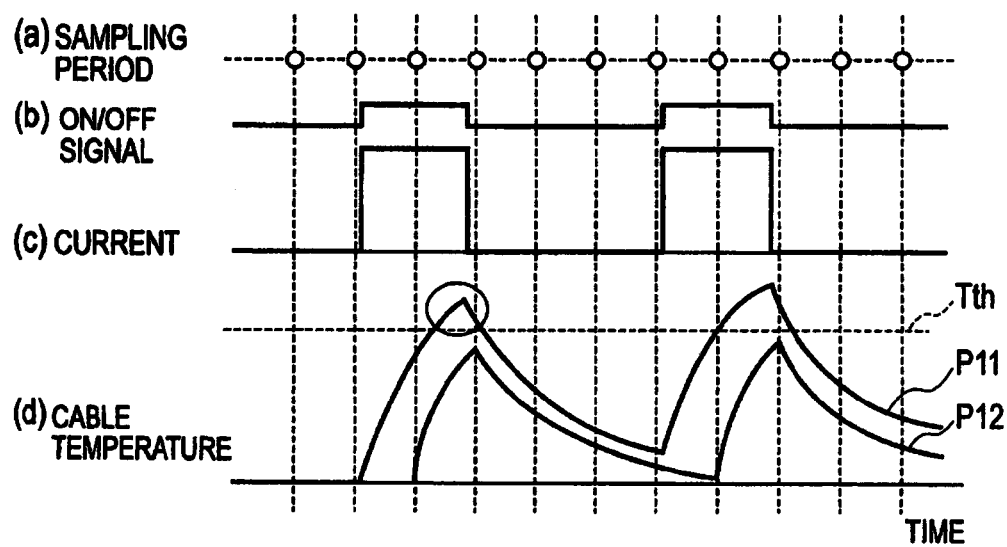
FIG. 1 is a timing chart illustrating a variation of each signal in a switching circuit protector according to a conventional example.
Figure 2:
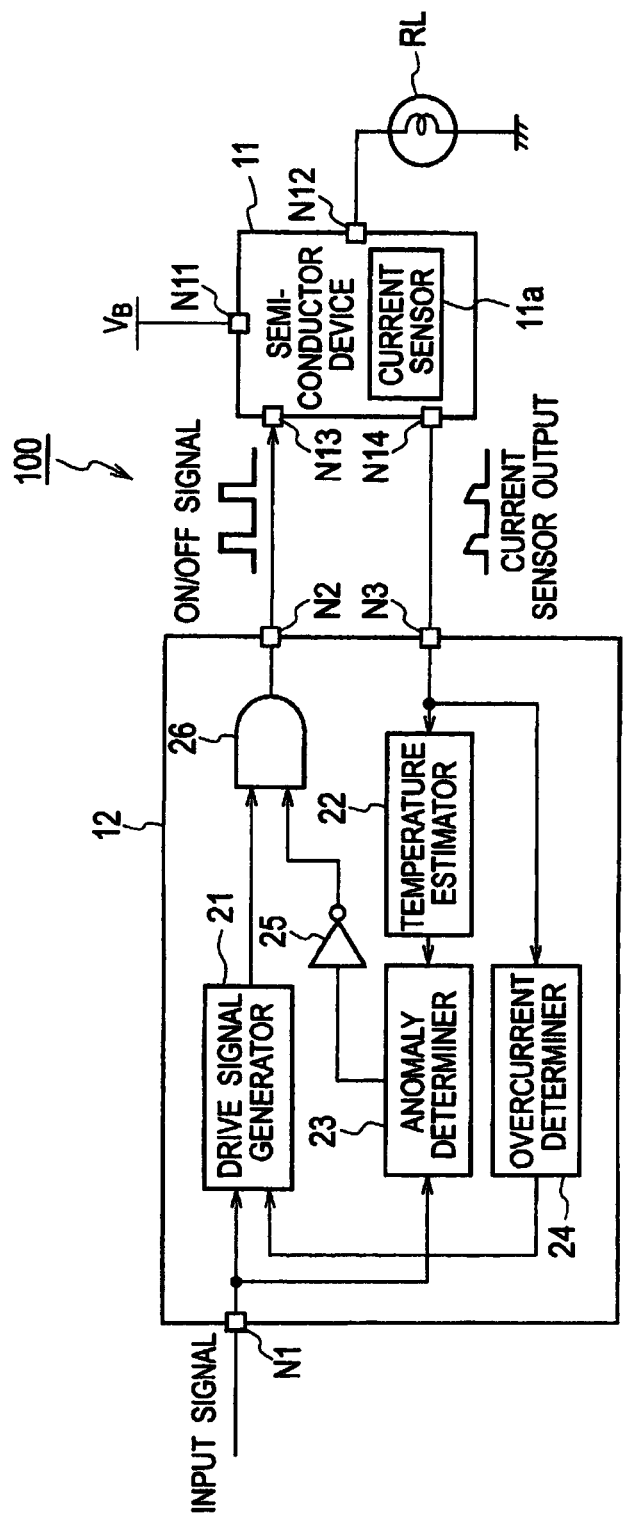
FIG. 2 is a circuit diagram illustrating a load driving circuit including a switching circuit protector according to an embodiment.

FIG. 2 is a block diagram illustrating a configuration of a load driving device equipped with a switching circuit protector according to an embodiment. As illustrated in FIG. 2, a load driving device 100 includes a semiconductor device 11 provided between a power supply VB and a load RL to switch the load RL from a driven state to a stopped state, and a controller 12 which controls an on/off state of the semiconductor device 11.

The semiconductor device 11 includes a semiconductor switch such as a MOSFET, which operates according to a PWM (pulse width modulation) signal output from the controller 12 to supply power to the load RL. The semiconductor device 11 includes a current sensor 11a such as shunt resistor, which outputs a current signal detected by the current sensor 11a to the controller 12.

The controller 12 includes three connection terminals N1, N2 and N3 connected to external devices, a drive signal generator 21, a temperature estimator 22, an anomaly determiner 23, an overcurrent determiner 24, an inverter 25, and an AND gate 26.

The drive signal generator 21 generates a PWM signal when an input signal is provided from an external switch or the like, and outputs the generated PWM signal to the AND gate 26. The drive signal generator 21 changes the PWM signal to a DC signal when a DC drive command signal is supplied from the overcurrent determiner 24, and then outputs the DC signal to the AND gate 26.

The temperature estimator 22 estimates a temperature of a cable of the switching circuit by a method described below based on a current value detected by the current sensor 11a and a conducting time of the current.

The anomaly determiner 23 outputs a temperature anomaly signal when the temperature of the cable estimated by the temperature estimator 22 exceeds a predetermined threshold temperature. That is, the anomaly determiner 23 changes the output signal from an L-level to an H-level. The inverter 25 output an input signal after inverting the signal. That is, when the signal at the H-level is output from the anomaly determiner 23 as the temperature anomaly signal, the inverter 25 inverts the H-level signal to the L-level signal.

The overcurrent determiner 24 outputs the DC drive command signal to the drive signal generator 21 when the current value detected by the current sensor 11a exceeds a predetermined threshold current Ith.

The AND gate 26 outputs a signal at the H-level when the output signal of the drive signal generator 21 and the output signal of the inverter 25 are both at the H-level.

(Estimation Process Of Temperature Of Cable)

Next, a process of estimating the temperature of the cable by the temperature estimator 22 is explained below.

First, a calculation process of an increased temperature is explained. When a current flows in the cable connected to the load RL, power consumed in the cable: Pcin (watt) can be calculated according to the following formula (1), $$Pcin = rc\, I^2, \quad (1)$$

where rc is a resistance of the cable (ohm), and I is a current flowing in the cable (ampere).

Further, energy per unit time released from the cable: Pcout (watt) can be calculated according to the following formula (2), $$Pcout = Qc(n-1)/(Cth\, Rth), \quad (2)$$

where Rth is a thermal resistance of the cable (degree Celsius/watt), Cth is a heat capacity of the cable (joule/degree Celsius), and $Qc(n-1)$ is a final value of a quantity of heat of the cable after a last sampling (joule).

Further, a difference (Pcin−Pcout) is calculated based on the formulae (1) and (2), and the difference is then multiplied by an elapsed time after a recent sampling: dt (second). Thus, a quantity of heat generation or a quantity of heat radiation at a present time after the recent sampling can be calculated. Therefore, a quantity of heat stored in the cable at the present time after the recent sampling: $Qc(n)(dt)$ (joule) can be calculated by a following formula (3), $$Qc(n)(dt) = Qc(n-1) + (Pcin - Pcout)dt. \quad (3)$$

Further, an increased temperature of the cable: $dT(dt)$ (degree Celsius) can be calculated by dividing the quantity of heat $Qc(n)(dt)$ by the heat capacity Cth. Namely, the increased temperature can be calculated by following formula (4)

$$dT(dt) = Qc(n)(dt)/Cth. \quad (4)$$

Then, $dT(dt)$ calculated by the formula (4) is added to a final estimated temperature calculated according to the last sampling (in the initial stage, an ambient temperature), so that an estimated temperature at the present time after the recent sampling can be calculated.

(Operation Explanation)

Figure 3:
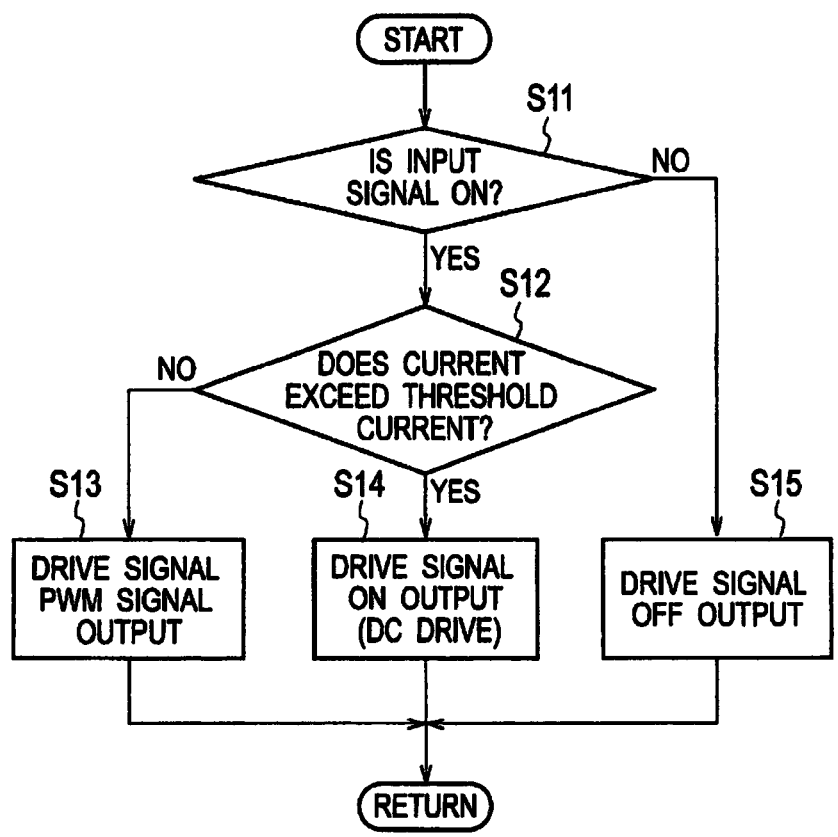
FIG. 3 is a flow chart illustrating a process operation of the switching circuit protector according to the embodiment.

An operation of the switching circuit protector according to the embodiment is explained below with reference to the flow chart illustrated in FIG. 3.

First, in Step S11, the drive signal generator 21 determines whether an input signal is on or not. When the input signal is off (NO in Step S11), the drive signal generator 21 turns a drive signal off in Step S15. Namely, the drive signal generator 21 does not output the drive signal (makes the output signal into the L-level).

When the input signal is on (YES in Step S11), the overcurrent determiner 24 determines whether or not the current flowing in the cable exceeds a threshold current Ith according to the current value detected by the current sensor 11a. When the overcurrent determiner 24 determines that the current does not exceed the threshold current Ith; that is, determines that an overcurrent is not caused in the cable (NO in Step S12), the overcurrent determiner 24 outputs an output command of a PWM signal to the drive signal generator 21 in Step S13. Namely, when the current flowing in the cable is a ordinary current, the semiconductor device 11 is controlled with PWM to drive the load RL.

When the overcurrent determiner 24 determines that the current exceeds the threshold current Ith; that is, determines that the overcurrent is caused in the cable (YES in Step S12), the overcurrent determiner 24 outputs an output command of a DC signal to the drive signal generator 21 in Step S14. Therefore, the drive signal output from the drive signal generator 21 is switched from the PWM signal to the DC signal. Accordingly, the semiconductor device 11 is shifted to the DC drive state, namely, is kept in the ON state, so that the semiconductor device 11 supplies power to the load RL.

Figure 4:
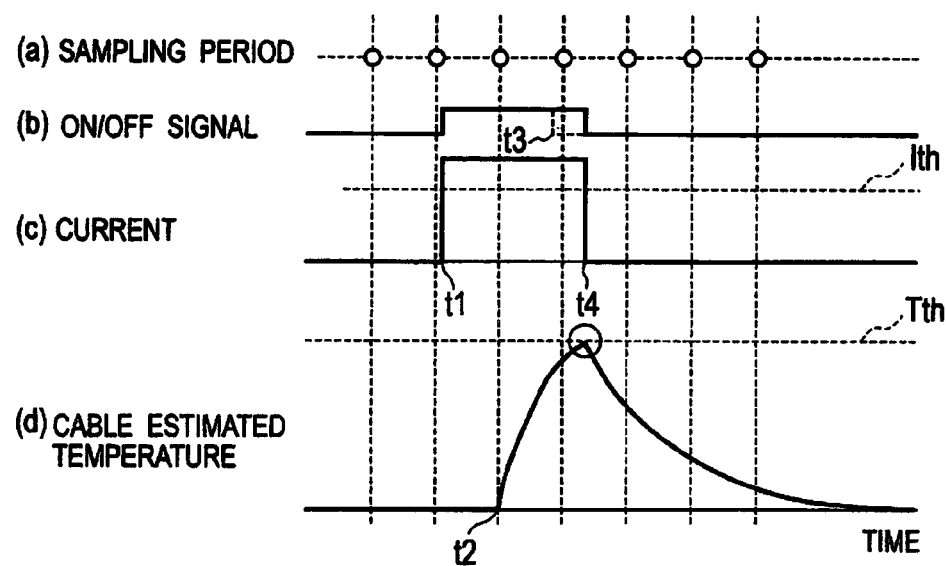
FIG. 4 is a timing chart illustrating a variation of each signal in the switching circuit protector according to the embodiment.

Next, the operation described above is further explained with reference to the timing chart illustrated in FIG. 4. In FIG. 4, plot (a) represents sampling period of the controller 12, plot (b) represents ON/OFF signals of the semiconductor device 11, plot (c) represents a current flowing in the switching circuit, and plot (d) represents an estimated temperature of the cable estimated by the temperature estimator 22.

Once the PWM signal is output from the drive signal generator 21, and the semiconductor device 11 is thus in the PWM drive state, the semiconductor device 11 is turned on as indicated by the plot (b) at the time t1. Then, a current starts to flow in the cable of the switching circuit in association with the turn-on state of the semiconductor device 11 as indicated by the plot (c). Subsequently, when the current flowing in the switching circuit exceeds a predetermined threshold current Ith, the overcurrent determiner 24 determines that an overcurrent is caused, and the drive signal generator 21 changes the output signal from the PWM signal to the DC signal.

Accordingly, the semiconductor device 11 is controlled to operate in the DC drive state. Thus, although the semiconductor device 11 is supposed to be turned off at the time t3 if the PWM drive is maintained, the semiconductor device 11 is kept in the ON state at the time t3 due to the shift to the DC drive state.

The temperature estimator 22 starts to estimate a temperature of the cable at the time t2, which is a first sampling timing after the time t1, and the estimated temperature gradually increases as indicated by the plot (d). The estimated temperature keeps increasing beyond the time t3, and reaches a threshold temperature Tth at the time t4. The anomaly determiner 23 thus detects an anomaly in temperature of the cable, and thereby changes the output signal from the L-level to the H-level.

As a result, the output signal of the AND gate 26 is shifted from the H-level to the L-level, and the semiconductor device 11 is thus turned off. Since the semiconductor device 11 is shifted from the PWM drive state to the DC drive state when the overcurrent determiner 24 determines that the current flowing in the switching circuit exceeds the threshold current Ith, the temperature of the cable estimated by the temperature estimator 22 keeps increasing and then reaches the threshold temperature Tth and as a result, the semiconductor 11 is broken.

When the current value detected by the current sensor 11a decreases and then falls below the threshold current Ith, the overcurrent determiner 24 changes the signal output to the drive signal generator 21 from the DC drive command to the PWM drive command. Therefore, the semiconductor device 11 is shifted to the PWM drive state again so as to drive the load RL with the ordinary operation.

Thus, in the switching circuit protector according to the embodiment, the current sensor 11a detects the current flowing in the switching circuit, and the semiconductor device 11 is controlled to operate in the DC drive state when the current exceeds the threshold current Ith. Therefore, in the switching circuit protector according to the embodiment, even when an error is caused between the actual temperature of the cable and the estimated temperature as in the case described in Background Art, the estimated temperature increases with time and then exceeds the threshold temperature Tth. Accordingly, the semiconductor device 11 can surely be broken, and the switching circuit and the load RL can be protected against heat.

For example, when a dead short circuit is caused in the switching circuit, the estimated temperature of the cable is calculated in a manner as to break the semiconductor device 11. Therefore, the switching circuit can be protected against heat generation due to the dead short circuit.

Further, since the semiconductor device 11 is shifted to the DC drive state when an overcurrent is caused in the cable, a switching number of times of the semiconductor device 11 in the overcurrent state can be reduced. Accordingly, damage to the semiconductor device 11 can be reduced.

Further, when the current decreases and falls below the threshold current Ith before the estimated temperature of the cable exceeds the threshold temperature Tth after the semiconductor device 11 is shifted to the DC drive state, the semiconductor device 11 is shifted to the PWM drive state again so as to return to the ordinary operation. Even when the semiconductor device 11 is not broken in the case of an inrush current caused when turning on the semiconductor device 11 or in the case of a short-time overcurrent such as noise, and the semiconductor device 11 is once shifted to the DC drive state, the semiconductor device 11 can return to the PWM drive state accordingly. Thus, it is possible to drive the semiconductor device 11 without accidentally breaking the semiconductor device 11.

Although the switching circuit protector according to the embodiment was explained above, the present invention is not limited to the description thereof, and the respective configurations can be replaced by arbitrary configurations having identical functions.

INDUSTRIAL APPLICABILITY

The present invention can be used for protecting a switching circuit for driving a load against heat.

The invention claimed is:

1. A switching circuit protector for protecting a switching circuit connecting a power supply to a load against heat generation, the switching circuit protector comprising:
   a semiconductor switch provided in the switching circuit to switch the load from a driven state to a stopped state;
   a current sensor for detecting a current flowing in the switching circuit;
   a controller configured to control the semiconductor switch to operate in a PWM drive state when receiving a PMW drive input signal;
   a temperature estimator for estimating a temperature of a cable of the switching circuit based on the current flowing in the switching circuit and a conducting time of the current as an estimated temperature;
   an anomaly determiner which outputs an off command to the semiconductor switch when the estimated temperature exceeds a predetermined threshold temperature; and
   an overcurrent determiner which determines whether or not the current detected by the current sensor exceeds a predetermined threshold current, wherein
   the controller changes the semiconductor switch from the PWM drive state to a DC drive state when the overcurrent determiner determines that the current exceeds the threshold current, so that the semiconductor switch is kept in an ON state, so that the semiconductor device supplies power to the load.

2. The switching circuit protector according to claim 1, wherein the controller is configured to control the semiconductor switch to return to the PWM drive state from the DC drive state when the current falls below the threshold current after the overcurrent determiner determines that the current exceeds the threshold current.

3. The switching circuit protector according to claim 1, wherein the semiconductor switch comprises a MOSFET, the current sensor comprises a shunt resistor.

4. The switching circuit protector according to claim 1, further comprising an inverter, and an AND gate.

5. The switching circuit protector according to claim 4, wherein the controller controls the semiconductor switch to
- operate in the PWM drive state by outputting a PWM output signal to the AND gate,
- operate in the DC drive state by changing the PWM output signal to a DC output signal when a DC drive command signal is supplied from the overcurrent determiner, and output the DC output signal to the AND gate.

6. The switching circuit protector according to claim 5, wherein the anomaly determiner outputs the off command to the semiconductor switch when the estimated temperature exceeds a predetermined threshold temperature by:
- changing an output signal of the anomaly determiner from a L-level to a H-level; and
- inputting the output signal of the anomaly determiner to the inverter, which outputs the inputted output signal of the anomaly determiner after inverting the inputted output signal such that when the output signal of the anomaly determiner is at the H-level, the inverter inverts the H-level signal and outputs a L-level signal to the AND gate.

7. The switching circuit protector according to claim 6, wherein the AND gate outputs a signal at the H-level when an output signal of the controller and an output signal of the inverter are both at the H-level.

8. The switching circuit protector according to claim 1, wherein the temperature estimator estimates the temperature of the cable of the switching circuit based on the current flowing in the switching circuit and the conducting time of the current as the estimated temperature by:
- calculating a power consumed in the cable;
- calculating an energy per unit time released from the cable;
- calculating a difference between the calculated power consumed and the energy per unit time released;
- multiplying the calculated difference by an elapsed time after a recent sampling;
- calculating a quantity of heat generation at a present time after the recent sampling;
- calculating a quantity of heat stored in the cable at the present time after the recent sampling;
- calculating an increased temperature of the cable by dividing the quantity of heat stored in the cable by a heat capacity of the cable; and
- adding the calculated increased temperature to a final estimated temperature calculated according to the last sampling, such that the estimated temperature is calculated for the present time after the recent sampling.

9. The switching circuit protector according to claim 1, wherein
- the controller changes the semiconductor switch from the PWM drive state to the DC drive state when the overcurrent determiner determines that the current exceeds the threshold current, such that the semiconductor switch is shifted to the DC drive state,
- in the DC drive state, the semiconductor switch is kept in the ON state such that the semiconductor switch supplies power to the load.

10. The switching circuit protector according to claim 1, wherein
- in the DC drive state, the estimated temperature gradually increases, and
- when the estimated temperature exceeds the predetermined threshold temperature, the anomaly determiner outputs the off command to the semiconductor switch;
- a drive state of the semiconductor switch changes from the DC drive state to an off state.

* * * * *